United States Patent
Brainard, II

[15] 3,668,617
[45] June 6, 1972

[54] UNDERWATER COMMUNICATION SYSTEM

[72] Inventor: Edward C. Brainard, II, Marrian, Mass.

[73] Assignee: General Time Corporation, Stamford, Conn.

[22] Filed: June 9, 1969

[21] Appl. No.: 831,546

[52] U.S. Cl. ..............................340/4 E, 325/28, 340/5 R, 340/16 C
[51] Int. Cl. ......................................................H04b 13/02
[58] Field of Search....................340/4, 4 E, 5, 16 R; 325/28

[56] References Cited

UNITED STATES PATENTS

| | | | |
|---|---|---|---|
| 1,173,957 | 2/1916 | Hahnemann | 340/4 E |
| 3,172,076 | 3/1965 | Alinari | 340/4 E |
| 3,214,728 | 10/1965 | Higgins | 340/4 E |
| 3,287,753 | 11/1966 | Race | 9/8 |
| 3,329,929 | 7/1967 | Burnett | 340/4 E |
| 3,405,387 | 10/1968 | Koomey et al. | 340/5 |
| 3,497,869 | 2/1970 | Silverman | 340/4 |

FOREIGN PATENTS OR APPLICATIONS

| | | | |
|---|---|---|---|
| 510,471 | 3/1955 | Canada | 340/4 E |
| 188,676 | 12/1922 | Great Britain | 340/4 E |

OTHER PUBLICATIONS

Hardy, A System of Short Range Communication Etc., June 1945, University of Penn., pp. 1– 8, 10, 12, 14 relied on QC 225 p. 4.

Primary Examiner—Richard A. Farley
Attorney—Pennie, Edmonds, Morton, Taylor & Adams

[57] ABSTRACT

An underwater communication system wherein communication is achieved through an alternating electric field between spaced-apart pairs of transmitting and receiving electrodes in conductive contact with the water. The transmitting and receiving electrodes are horizontally oriented and two pairs of orthogonally disposed receiving electrodes can be used to provide omnidirectional communication. The receiver is responsive only to properly coded signals. According to one embodiment the receiver responds only to signals of a selected frequency and duration, and is not effected by short bursts of noise or the cumulative effect of short signals. According to other embodiments various different coding and redundancy techniques are employed.

23 Claims, 5 Drawing Figures

INVENTOR
EDWARD C. BRAINARD II

BY
Morgan, Finnegan, Durham & Pine
ATTORNEYS

FIG. 4
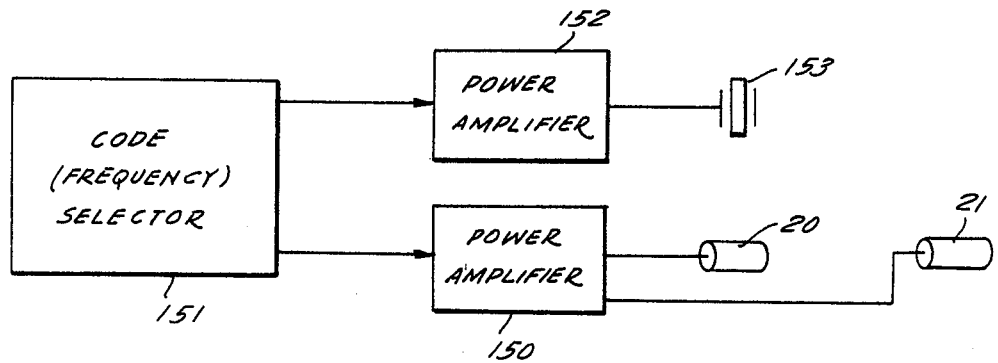
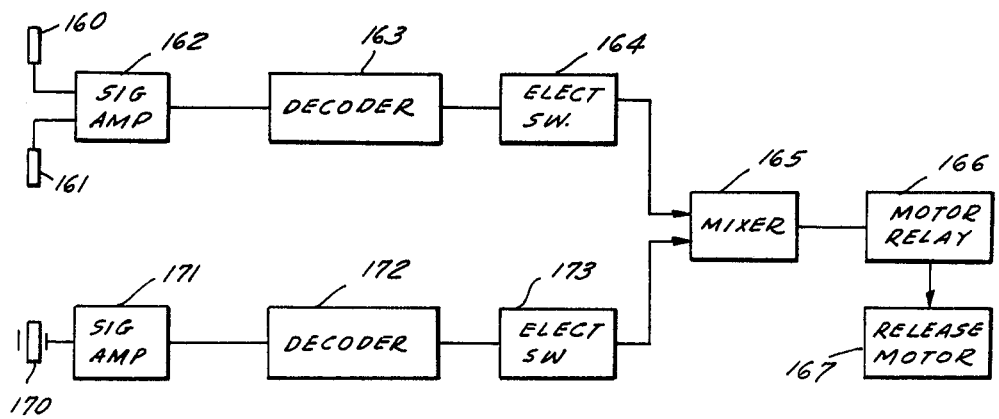
FIG. 5

UNDERWATER COMMUNICATION SYSTEM

BACKGROUND OF THE INVENTION

This invention relates to underwater communication systems, and while not limited thereto, relates particularly to underwater systems suitable for releasing submerged instrument packages and the like.

In conducting underwater studies, sophisticated instrument packages are often submerged for predetermined periods of time, often as long as several months. While submerged, the instrument package gathers data on water temperature, salinity, oxygen content, velocity of water movement, etc., and records this data on a suitable medium such as magnetic tape. At the end of the survey period the instrument package is released so that it floats to the surface and can be recovered. It is essential that the system which releases the instrument package on command be highly reliable to not only avoid loss of the valuable instrument package, but to also avoid loss of valuable accumulated data and to minimize the time and effort required for recovering the instrument package. Although not limited to this field of use, the invention provides a highly reliable and effective system for achieving recovery on demand.

In the past most underwater communication has been achieved via acoustic transmissions wherein an electrical transducer is electrically energized to provide pressure vibrations which are propogated through the water. Although effective communication has been achieved with acoustic techniques there are, nevertheless, a number of problems which limit the effectiveness of this approach. For example, thermal discontinuities or salinity discontinuities in the water create interfaces which can reflect large portions of the transmitted signal thereby often making it impossible to effectively communicate beyond the area of the discontinuity. Natural obstructions in the water create shadow areas behind the obstruction which are not penetrated by the acoustic signals. Natural noise and multiple reflections are also known to create problems in achieving effective acoustic communication.

Another known, but seldom used technique for underwater communication utilizes an alternating electric field developed for example, by applying an alternating electric signal to spaced-apart electrodes which are in conductive contact with the water. Communication can be achieved through the electric field, the signal being detected at the receiver by another pair of spaced-apart electrodes.

An object of this invention is to provide an effective underwater communication system employing the alternating electric field technique.

Another object of the invention is to provide a highly reliable system for releasing submerged objects in relatively shallow water, as for example on the continental shelf or in areas where the depth is on the order of 1,200 feet or less.

Another object of the invention is to provide an effective underwater communication system not adversely affected by thermal or salinity discontinuities or shadow areas behind obstructions.

Another object of the invention is to provide an underwater communication system not adversely affected by noise, reflections or the like.

BRIEF DESCRIPTION OF THE INVENTION

In the system according to the invention, an alternating electric field is established in the communication medium, i.e. the water. This is achieved by applying an alternating signal to a pair of spaced-apart electrodes which are in conductive contact with the water. Generally, the greater the separation between the electrodes, the more effective the communication, satisfactory communication being achieved with a transmitting electrode separation of approximately 150 feet. When the electrodes are energized, an electric field is established in the medium. When this field is mapped, it is found to have ionic current flow lines which follow eccentric circular configurations with each such circular configuration passing through both of the electrodes. The orthogonal equipotential lines are found in eccentric circular paths surrounding one or the other of the electrodes.

A communication signal is received via the electric field by means of a pair of spaced-apart receiving electrodes. For effective communication the receiving electrodes are preferably oriented so that they lie tangential to the current flow lines which thereby establishes the maximum possible potential difference between the electrodes for a designated electrode spacing.

With a transmitter operating at approximately one kilohertz and producing 1.3 kilowatts applied to the transmitting electrodes operated by 150 feet and with a receiver responsive to input signals which are fractions of a microvolt and having a gain of approximately 145 db, effective communication has been achieved at distances greater than 3,000 feet with a receiver electrode spacing of 18 feet.

The system can be adapted for either salt water or fresh water operation. In salt water (35 parts per thousand at 20° C.) effective results are achieved by applying a 40 volt signal to the transmitting electrodes. In fresh water (5 parts per thousand at 20° C.) similarly effective results are achieved by applying a 1,000 volt signal to the transmitting electrodes. Generally, the transmitting potential should be increased as the conductivity of the water decreases.

It has been found that the best communication in shallow waters (for example at Continental shelf depths) is achieved with a horizontal receiving electrode orientation. This is particularly true near the boundary area such as exists near the ocean floor. Apparently, the electric field becomes distorted in the boundary region such that the ionic current flow lines tend to follow the boundary. Therefore, the potential gradient near the ocean floor appears to be predominantly horizontally oriented regardless of the manner in which the field is established. Not only has a horizontally oriented receiver electrode structure been found to provide effective reception in areas near the ocean floor, but the same electrode orientation has been found to provide equally effective reception at intermediate depths and, hence, the receiver effectiveness is independent of depth, a condition not found to exist with other receiver electrode orientations.

It has also been found that a horizontal orientation of the transmitting electrodes is preferable since with such an orientation the electrodes can easily be assembled in a tow cable or attached to the bow and stern of the ship which transmits the signals. The horizontal orientation also eliminates the cone of silence or dead zone directly beneath the transmitting electrodes as would exist, for example, with vertically oriented transmitting electrodes. Electric field patterns which include dead zones, particularly when located directly beneath the transmitter, are confusing to the operator since maximum coupling with the receiver does not exist at the point which would normally be expected and further because the most effective position for communicating with a particular underwater object would vary according to the depth of the object.

Thus, by orienting both the transmitter and receiving electrodes horizontally, effective communication is established wherein maximum coupling exists when the electrodes are one above the other and this effect exists regardless of receiver depth when within range. With horizontally disposed transmitting and receiving electrodes, the electric field has a north-south, east-west orientation. With a two electrode receiver system, this problem can be overcome by using an orthogonal steaming pattern for the ship while endeavoring to communicate with the submerged object. According to another embodiment of the invention, the receiver is provided with two pairs of orthogonally disposed receiving electrodes which are electrically interconnected within the receiver so that effective omnidirectional communication can be achieved.

To eliminate the effect of noise or spurious signals, the receiver unit according to one embodiment of the invention, is arranged to filter out signals of a predetermined frequency and to thereafter discriminate and integrate incoming signals to eliminate the effect of noise signals which usually occur in relatively short bursts. The receiver is further responsive only to incoming signals of a predetermined continuous duration, this being achieved by means of a motor latch drive which is driven in the forward direction during receipt of a signal, but which is driven in the opposite direction returning to the fully latched position during the absence of a received signal. This arrangement eliminates the cumulative effect of noise bursts during the several months in which the instrument package is submerged.

According to another embodiment of the invention, other signal coding techniques can be employed so that the received signal can be separated from noise and other spurious transmissions. Also, a redundancy technique can be employed wherein signals are received through an electric field and are also received via an acoustic transmission.

BRIEF DESCRIPTION OF THE DRAWINGS

The manner in which the foregoing and other objects in accordance with this invention are achieved is described more fully in the following detailed specification which sets forth several illustrative embodiments of the invention. The drawings form part of the specification wherein:

FIG. 4 is a block diagram showing a transmitter unit according to the invention; and FIG. 5 is a block diagram illustrating an alternative receiver circuit arrangement.

DETAILED DESCRIPTION OF THE INVENTION

Figure 1:
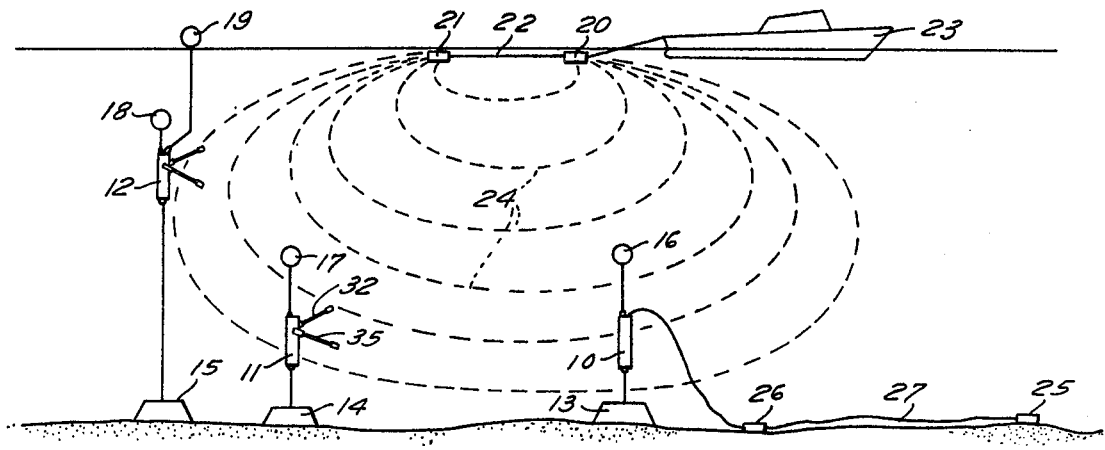
FIG. 1 is a diagram illustrating several arrangements for transmitting and receiving electrodes.

FIG. 1 illustrates the electrode arrangements for releasing submerged instrument packages 10, 11 and 12. The instrument packages include instrumentation for gathering underwater data such as water temperature, salinity, flow velocity, etc., and normally include a magnetic tape recorder for recording data over a relatively prolonged period of time. The instrument packages 10-12 also include receiver circuitry for detecting release signals to, in turn, release the instrument packages from their moorings 13, 14, and 15, respectively. Floats 16, 17, and 18 are attached to the top of the instrument packages 10-12, respectively, and provide sufficient buoyancy to float the instrument package to the surface when released from the associated morring. Where desired, a marker buoy 19 can be attached to the instrument package to mark its location.

The transmitting electrodes 20 and 21 are shown in FIG. 1 attached to a tow cable 22. These electrodes are conveniently cylindrical in configuration and can be constructed from any suitable conductive material preferably a material which is relatively inert in seawater and which does not produce resistive coatings. Copper electrodes plated with a thin outer lead coating have been found to produce satisfactory results. The transmitting electrodes are placed as far apart as is convenient, a 150 foot separation having been found to produce satisfactory operation. The electrodes 20 and 21 are individually connected to transmitting equipment in the boat 23 to which the tow cable is attached. As an alternative, the transmitting electrodes could be attached to the bow and stern of the ship hull and thereby eliminate the need for a separate tow cable.

When a potential difference is applied between electrodes 20 and 21, an electric field is developed in the water. The ionic current flow lines 24 of the electric field are in the form of somewhat circular paths each emanating from one of the electrodes and moving toward the other. The orthogonal equipotential lines (not shown in FIG. 1) would be in the form of eccentric circular paths surrounding one or the other of the electrodes. The strength of the electric field diminishes as the distance from the transmitting electrodes increases. Also, it seems that the shape of the electric field is affected by boundary conditions such as the ocean floor. As a result, the lower portion of the electric field tends to flatten out such that the flux lines tend to follow the ocean floor contour in the lower portion of the electric field.

The signal applied to the transmitting electrodes is preferably in the range between 400 and 10,000 hertz at a power level between 130 and 1,300 watts.

When the instrument package is moored near the ocean floor, the receiving electrodes can simply be spaced apart and attached to the instrument package via an electrical cable, such as electrodes 25 and 26 attached to instrument package 10 via cable 27. With the two electrode receiving arrangement, maximum coupling occurs when the transmitting electrodes have the same horizontal orientation i.e., aligned in the same horizontal direction as do the transmitting electrodes 20 and 21. Therefore, when the instrument package is being recovered, the boat 23 should periodically change direction and preferably follow an orthogonal steaming pattern so that in at least part of the pattern the electrodes will be parallel. The advantage of the arrangement including electrodes 25 and 26 is that a large electrode separation can be achieved relatively inexpensively.

Figure 2:
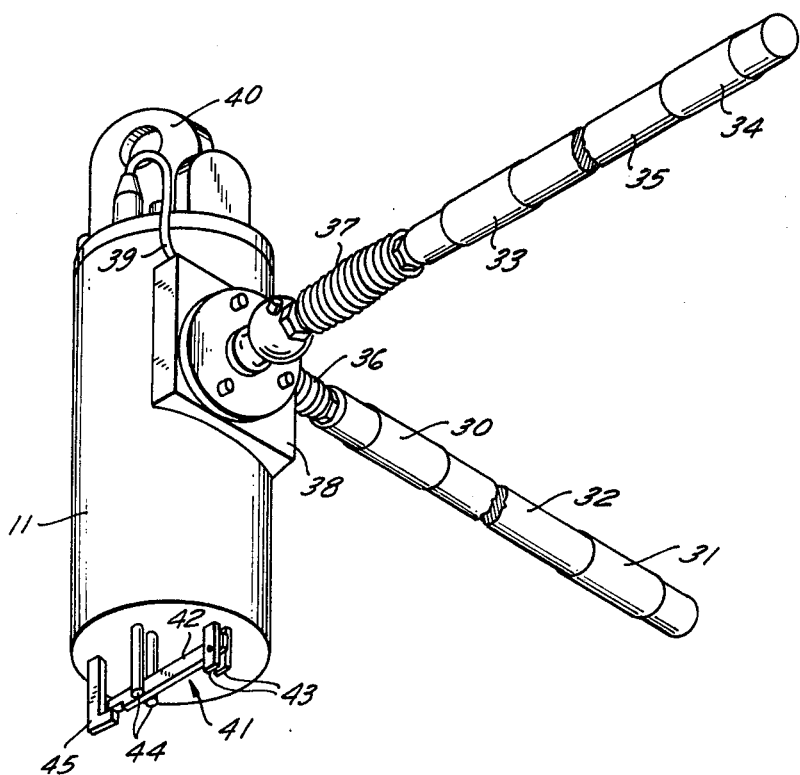
FIG. 2 is a perspective illustration showing the instrument package with associated receiving electrodes arranged according to one embodiment of the invention.

An omnidirectional receiving electrode arrangement is attached to instrument package 11 and is shown in more detail in FIG. 2. A pair of tubular receiving electrodes 30 and 31 are secured to a hollow fiberglass electrode pole 32 and another pair of receiving electrodes 33 and 34 are similarly secured to an electrode pole 35. The electrode poles are preferably of a telescoping structure and are secured to the casing of instrument package 11 via heavy duty springs 36 and 37. Electrodes 33 and 34 are connected to the receiver circuitry within the instrument package by means of a cable 39 which passes through the center of pole 35 and electrodes 30 and 31 are similarly coupled to the receiver circuitry via a cable passing through the center of pole 32.

Electrode poles 32 and 35 are at right angles to one another and extend horizontally from instrument package 11. In each case one electrode of the pair is located near the instrument package, and the other electrode is located near the outer end of the electrode pole. The electrode poles may be approximately 19 feet in length when fully extended and, therefore, an electrode separation of approximately 16 feet can readily be achieved. The two electrode pole structure extends from one side of the instrument package and is preferable since the V-shaped configuration facilitates easier handling during the submerging and recovery operations. Also, the V-shaped configuration tends to orient itself with the water flow direction to thereby minimize accumulation of seaweed and other debris on the electrode poles.

The electrode poles are neutrally buoyant or, in other words, the structure is so designed that the electrode poles neither tend to rise nor do they tend to drop. The electrode poles therefore tend to remain horizontal.

The maximum coupling between the transmitting and receiving electrodes occurs when the transmitting electrodes are directly above the receiving electrodes. It should be noted that both the transmitting and receiving electrodes are horizontally oriented which provides effective communication at any depth and particularly near the ocean floor where there is relatively little, if any, vertical potential gradient.

An eyelet 40 extends from the top of the instrument package for attachment to flotation gear and additional instrumentation packages where desired. The mooring is secured to the latch mechanism 41 located at the bottom of the instrument package.

The latch mechanism includes a release bar 42 secured between a pair of extensions 43 which form a clevis at the pivotal end of bar 42. Bar 42 is in the position shown in FIG. 2 in the latched condition with the free end of bar 42 resting between a pair of guide pins 44. A motor driven rotating latch 45 normally secures the free end of release bar 42 as shown in FIG. 2. A suitable loop or ring attached to the mooring is secured around bar 42 in the area between clevis 43 and guide pins 44. If desired a notch can be placed in the upper side of the release bar to normally maintain the loop or ring near the pivot end of the bar. When latch 45 is rotated to free the end of bar 42, the release bar is free to pivot away from the bottom of the instrument package so that the loop attached to the mooring slides off the end of bar 42. As a result, the instrument panel can float to the surface.

Figure 3:
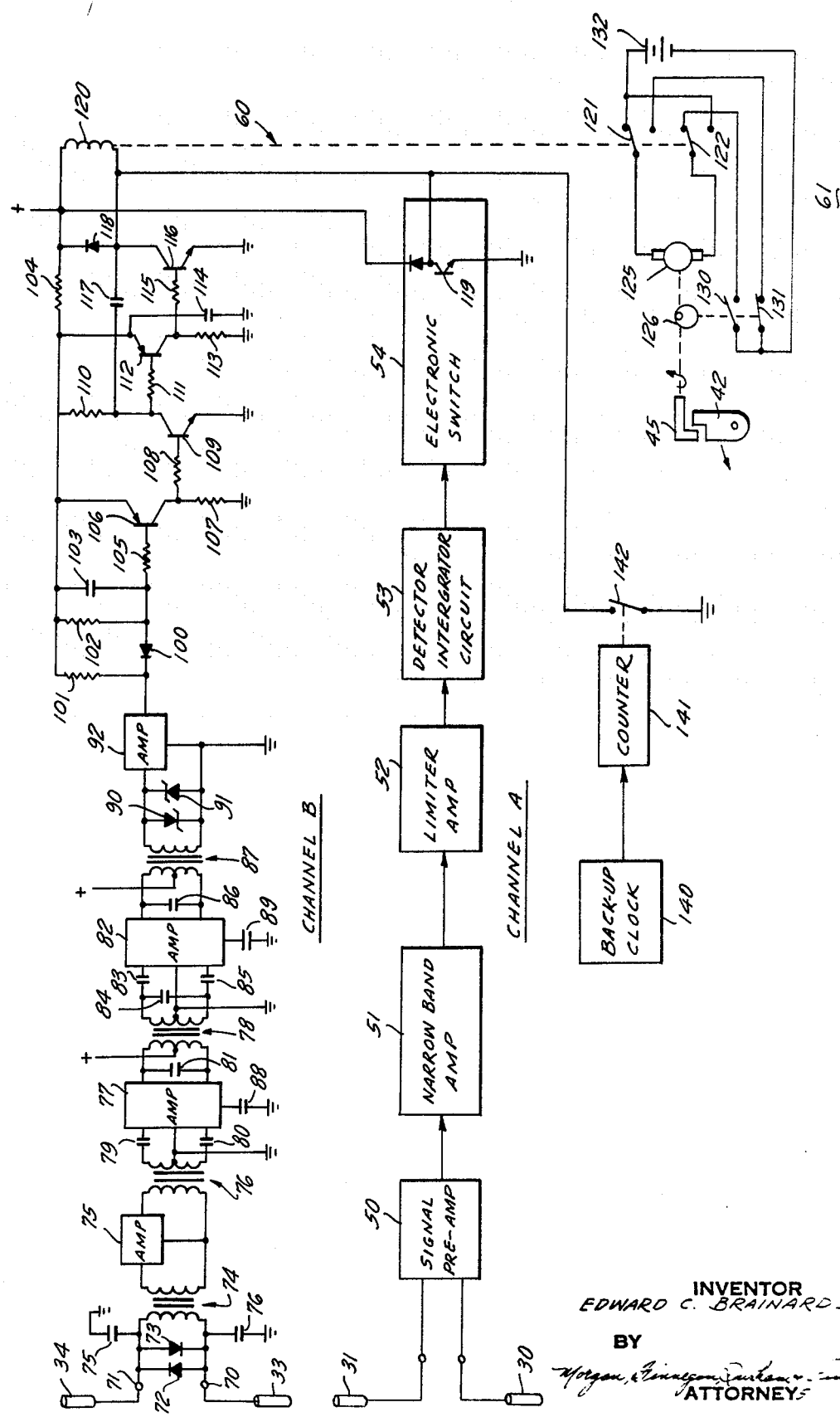
FIG. 3 is a part schematic, part block diagram illustration of the receiver circuitry for use with an instrument package such as that shown in FIG. 2.

The receiver circuitry for the unit in FIG. 2 is shown in FIG. 3 and includes two identical input channels designated channels A and B. Electrodes 30 and 31 are connected to the input of channel A and electrodes 33 and 34 are connected to the input of channel B. Channel A is illustrated in block diagram form, whereas channel B is illustrated schematically. However, it is to be understood that the two channels are identical in the actual unit. In cases where only a single pair of receiving electrodes is used, the receiver would only include a single channel.

Considering first the block diagram representation for channel A, electrodes 30 and 31 are connected to a signal pre-amplifier stage 50 which, in turn, is coupled to a pair of narrow band amplifier stages 51. The signal emerging from amplifier stages 51 passes through a limiter-amplifier stage 52 and a detector-integrator circuit 53 to selectively activate an electronic switch circuit 54. The output of the electronic switches in channels A and B are connected in parallel to energize a relay 60 which, in turn, controls the motor driven latch circuitry 61. In the presence of the appropriate incoming signal in either one of channels A or B, relay 60 is energized and, therefore, the motor rotates the latch 45 toward an open position. In the absence of an appropriate input signal, relay 60 returns to the de-energized state and energizes the motor in the reverse direction until the latch returns to the fully latched position.

The integrator portion of circuit 53 is designed with a time constant which nominally requires an input signal having a duration of approximately one second before a signal is supplied to actuate electronic switch 54. The time period required for actuation of the electronic switch varies in accordance with the incoming signal magnitude and would be somewhat less for large incoming signals and somewhat greater for small incoming signals. Limiter-amplifier circuit 52 limits the amplitude of the incoming signal so that very large amplitude short duration, noise signals will not pass through the integrator circuit. The motor driven latch circuit 61 is designed to acquire approximately 20 seconds to rotate latch 45 to the point where bar 42 is released. The circuit thus requires a continuous signal for the 20 second duration to effect a release of the instrument package. The effect of sporadic input signals is eliminated because the operation of circuit t1 is noncumulative since, during the absence of an incoming signal, the motor driven latch circuit returns to the fully latched position to thereby cancel the effect of any interim short duration input signals.

In the schematic representation for channel B, one of the electrodes 33 is coupled to one end of the primary winding of a coupling transformer 74 via an input terminal 70 and the other electrode 34 is connected to the other end of the primary winding via a terminal 71. Back-to-back diodes 72 and 73 are connected across the primary winding to limit input signals to the forward conducting threshold voltages of the diodes. The ends of the primary winding are coupled to ground via capacitors 75 and 76 to by-pass high frequency signals.

The pre-amplifier circuit 75 can be in the form of an integrated circuit and is coupled between the secondary winding of coupling transformer 74 and the primary winding of coupling transformer 76.

The secondary winding of coupling transformer 74 has a grounded center tap connected to an input of a narrow band amplifier stage 75, the ends of this secondary winding being coupled to amplifier 75 via coupling capacitors 79 and 80. The output of amplifier 77 is connected to the ends of a tapped primary winding of a coupling transformer 78. A capacitor 81 is connected across the primary winding of transformer 81 and a capacitor 88 is coupled between the amplifier and ground. Capacitors 79 and 80 provide DC isolation at the input of the amplifier stage and block undesired low frequency signals whereas capacitor 81 at the output of the amplifier shunts high frequency signals to thereby provide a narrow bandpass amplifier stage.

Amplifier 82 is similarly connected between the secondary winding of transformer 78 and the tapped primary winding of another coupling transformer 87. The grounded center tap of the secondary winding of transformer 78 is connected to amplifier 82 and the ends of the winding are connected to the amplifier via coupling capacitors 83 and 85. A capacitor 83 is connected across the primary winding in transformer 78 and a capacitor 86 is connected across the primary winding of transformer 87, these capacitors serving to shunt high frequency signals. Capacitor 89 provides a ground coupling for amplifier 82.

Amplifiers 77 and 82 are similar to one another and can be conventional integrated circuits. The positive supply for the amplifiers is achieved via the connection to the center taps of the primary windings of transformers 78 and 87.

The secondary winding of transformer 87 is coupled to the limiter-amplifier stage which includes back-to-back diodes 90 and 91 connected across the secondary winding. The diodes are selected having a relatively high threshold voltage to thereby limit signals appearing across the secondary winding to the forward threshold potential of the diodes. Amplifier 92 is also an integrated circuit, the input of the amplifier being connected to one end of the secondary winding of transformer 87 with the other end of the secondary winding and the amplifier being coupled to ground.

The output of amplifier 92 is coupled to the base of a transistor 106 in the electronic switch circuit via a diode 100 in series with a base resistor 105. The output of amplifier 92 is coupled to the positive source via a resistor 101, and the anode of diode 100 is coupled to the positive source via a resistor 102, the coupling of resistors 101 and 102 to the positive source being completed via resistor 104. An integrating capacitor 103 is connected in parallel with resistor 102.

Diode 100 functions as the detector by rectifying the alternating output signal from amplifier 92 to provide a corresponding pulsating DC envelope. The signal emerging from diode 100 is integrated by capacitor 103 which is coupled across the emitter-base circuit of transistor 106. The time constant provided by resistor 102 and capacitor 103 is selected to nominally require approximately a one second period to build up a sufficient potential across the capacitor to overcome the emitter-base threshold potential of transistor 106. For large incoming signals limited by back-to-back diodes 90 and 91, this time period may be on the order of 0.5 seconds whereas for very small signals the time period may approach two seconds.

The electronic switch includes four transistors, namely transistors 106 and 112 which are of the PNP type and transistors 109 and 116 which are of the NPN type. The switch circuitry is designed so that the transistors tend to operate in a switching mode and are either fully nonconductive or fully conductive to thereby minimize power consumption in the electronic switch circuitry.

Specifically, the emitters of transistors 106 and 112 are coupled directly to the positive source via resistor 104, and the emitters of transistors 109 and 116 are coupled directly to ground. Transistors 106, 109 and 112 develop output signals across their respective collector resistors, collector resistors 107 and 113 being connected between ground and the collectors of transistors 106 and 112 and collector resistor 110 being connected between the collector of transistor 109 and the positive source (via resistor 104). Base resistors 108, 111 and 115 couple the collector of one stage to the base of the next stage. Transistor 116 is a power output stage and controls current flow through energizing winding 120 of relay 60, the energizing winding being connected between the collector and the positive source. A diode 118 is connected across winding 120 to bypass inductive surges when the winding is de-energized and a capacitor 114 is connected between the emitter of transistor 112 and ground to bypass spurious high frequency signals. A capacitor 117 is connected between the collectors of transistors 109 and 116 to provide regenerative feedback during switching transients.

When a sufficient input signal is developed across integrating capacitor 103, this signal tends to render transistor 106 conductive which, in turn, renders transistors 109, 112 and 116 conductive. The circuits are designed so that the gains of the stages are sufficient to rapidly drive the transistors to the fully conductive state. The regenerative coupling accomplished via capacitor 117 serves to facilitate rapid transition to the fully conductive states when an incoming signal is present or to the fully nonconductive states in the absence of a signal.

The output transistor stage 119 of electronic switch 54 in channel A is shown partially schematically and, as can be seen from the diagram, the collector of transistor 119 is also connected to the positive source via energizing winding 120, the emitter of transistor 119 being coupled to ground. The diode in series with the collector transistor 119 is also in parallel with winding 120 to bypass inductive surges. Accordingly, when either of transistors 116 or 119 is in the fully conductive state, the energizing winding, in effect, is connected between the positive source and ground via the collector-emitter circuits of one of the transistors. In this fashion an incoming signal received either via channel A or via channel B is effective to energize relay 60.

Relay 60 includes movable contacts 120 and 122 connected to the armature 125 of a small DC motor. The motor shaft is coupled via a gear reduction unit (not shown) to a cam 126 and rotating latch 45. Cam 126 is arranged to operate limit contacts 130 and 131, movable contact 130 being coupled to the cam so that it is open only in the fully latched position and closed in all other positions, whereas movable contact 131 is closed except when the rotating latch 45 is in the fully open position.

In the normal de-energized state of relay 60, the positive terminal of a battery 132 is coupled to one side of armature 125 via movable contact 121, and the other side of the armature is returned to the negative terminal of the battery via movable contact 122 and movable contact 130. Thus, when the relay is in the de-energized state the motor will be energized and rotate until the fully latched position is reached at which time movable contact 130 is opened by cam 126. When relay 60 is energized the positive terminal of battery 132 is coupled to armature 125 via movable contact 122, and the other side of the armature is returned to the negative terminal of the battery via movable contacts 121 and 131. Therefore, when the relay is energized the motor rotates in the opposite direction and continues to rotate until the fully open position is reached at which time movable contact 131 opens. Accordingly, in order to free release bar 42 to thereby release the instrument package, it is necessary to have a continuous incoming signal for the time period required to rotate latch member 45 to the open position since any discontinuity in the input signal will permit the latch member to return to the latched position. The motor and gear reduction unit are so designed to require approximately 20 seconds rotation to travel from the fully latched position to the fully open position.

In the instrument package, it is desirable to include backup circuitry which will effect a release of the instrument package in the event that it becomes impossible to communicate with the instrument package. This is achieved by means of a backup clock 140 coupled to a counter 141. Counter 141 would be set to close associated contacts 142 after a predetermined period of time which is longer than the time period during which the instrument package would normally be submerged. When contacts 142 are closed, energizing winding 120 of relay 60 is coupled between the positive source and ground via movable contact 142 to thereby energize the relay which, in turn, energizes armature 145 to rotate latch 45 to the open position.

The transmitter which can be coupled to transmitting electrodes 20 and 21 (FIG. 1) is shown in FIG. 4 in block diagram form. For the receiver illustrated in FIG. 3, a transmitter unit would consist of a code selector 151 coupled to the transmitting electrodes 20 and 21 via a power amplifier 150. Code selector 151 would simply include a crystal controlled oscillator providing a signal corresponding to the frequency to which the amplifiers 50 and 51 in the receiver (FIG. 3) are tuned. The output signal from the code selector is amplified by power amplifier 150 to provide an output signal of between 130 and 1,300 watts, as desired for the particular transmitting conditions. Preferably, the code selector would include interchangeable crystals so that signals of different frequencies in the range between 400 and 10,000 hertz could be transmitted to thereby achieve selective communication with different instrument packages in the same general vicinity.

Power amplifier 152 includes circuitry which permits the proper coupling of the output signal to the medium. This could include a tapped transformer coupling at the output of the amplifier arranged so that one tap, for example, applied 40 volts to the transmitting electrodes for salt water operation and another tap applies 1,000 volts for fresh water operation. Similar results could be achieved automatically by means of a feedback circuit which automatically adjusts the output potential in accordance with the water conductivity.

In the system thus far described, the effects of noise or spurious signals have been eliminated by requiring a release signal of a continuous 20 second duration, the likelihood of occurrence of such a signal through noise or spurious oscillations being highly unlikely. However, other techniques can be utilized by designing code selector 151 to code the transmitted signal in a more complex fashion. For example, the transmitted signal could be amplitude modulated, frequency modulated, or have a combination of amplitude and frequency modulation. Also, the transmitted signal could be in a coded pulse form. The purpose of these techniques would be to provide a transmitted signal of a more complex nature which is unlikely to occur in noise or spurious oscillations.

In the event that a coding technique other than time duration, frequency selection is used, the receiver circuit would be modified as shown in FIG. 5. A pair of receiving electrodes 160, 161 are connected to a signal amplifier 162 which is tuned to receive the transmitted signal. The output of signal amplifier 162 goes to a decoder circuit 163 which detects the properly coded signal as determined by the code selected in the transmitter and, hence, would be responsive to properly coded amplitude modulation, frequency modulation or pulse coded signals. Decoder circuit 163 is connected to energize an electronic switch 164 when the proper signal is received and the electronic switch is coupled to a mixer circuit 165 to selectively energize a release motor 167 via a motor relay circuit 166.

In some cases it may be desirable to utilize acoustic transmission in combination with electric field transmission to achieve either redundant transmission for high noise rejection, or as an alternate channel for providing higher reliability. Transmission would be achieved by coupling code selector 151 (FIG. 4) to a suitable acoustic transducer 153 through a power amplifier 152 designed to provide the appropriate electrical signal energization for the transducer. The associated receiver circuitry would include a receiving transducer 170 (FIG. 5) connected to a tuned signal amplifier 171 which, in turn, is coupled to a decoder circuit 172. Decoder circuit 172 functions similar to decoder circuit 163 to detect signals having the proper amplitude modulation, frequency modulation, or pulse code modulation, as the case may be. Decoder circuit 172 is coupled to an electronic switch 173 which, in turn, operates release motor 167 via the mixer circuit 165 and motor relay circuit 166.

Mixer circuit 165 can be designed to perform either an OR logic function or an AND logic function. If the mixer circuit 165 is arranged to perform the OR logic function then either the signal received via the electric field and receiving electrodes 160 and 161 is effective to operate the release motor or, alternatively, an acoustic signal received via transducer 170 is effective to operate the release motor. Thus, if a signal is received either through the acoustic transmission or the electric field transmission, the release motor is operated and therefore alternative transmitting channels are provided to achieve greater reliability. On the other hand, if mixer circuit 165 is designed having an AND logic function, it would be necessary to receive a transmission via the electric field and, at the same time, receive a transmission acoustically. Since it is virtually impossible for the proper acoustic and electric signals to occur simultaneously in the form of noise or spurious transmissions, such a combined system would be virtually immune from false triggering.

Although several specific embodiments of the invention have been described in detail, it should be obvious to persons skilled in the art that there are numerous other variations within the scope of this invention. The invention is more particularly defined in the appended claims.

I claim:

1. An underwater communication system comprising a pair of spaced-apart transmitting electrodes in conductive relationship with the water;
   a code selector for providing a continuous predetermined electrical signal of a preselected frequency;
   a low frequency transmitter including said code selector and connected to said transmitting electrodes to establish an alternating electric field surrounding said transmitting electrode in accordance with said electrical signal;
   a pair of spaced-apart receiving electrodes in conductive relationship with the water and adapted to be disposed within said alternating electric field to receive said predetermined electrical signal; and
   a receiver connected to said receiving electrodes and including
      a tuned receiver input channel tuned to said preselected frequency, and
      an electronic switch operatively coupled to said input channel to become activated in response to incoming signals,
   a mechanical latch;
   a motor driven latch release requiring a predetermined period of time to go from a closed latched position to an open unlatched position, said motor driven latch release being coupled to said electric switch to drive said latch release toward said open position when said switch is activated and toward said closed position when said switch is not activated.

2. A system according to claim 1 further including a backup timer operatively connected to said motor driven latch release to activate the same after a preselected period of time to drive said latch release to said open position.

3. In an underwater communication system of the type including a low frequency transmitter having associated therewith spaced apart transmitting electrodes in conducting relationship with the water and substantially horizontally orientated to one another to establish an alternating electric field in the water, a receiver comprising:
   a neutrally buoyant electrode pole adapted for immersion in the water in a substantially horizontal orientation generally parallel to the transmitting electrodes;
   a pair of spaced-apart receiving electrodes carried by the pole in conductive relationship to the water so as to be in horizontal orientation when immersed; and
   a receiving circuit connected to the two receiving electrodes and responsive to the alternating electric field at the receiving electrodes for producing an output signal.

4. A system according to claim 3 further comprising a second neutrally buoyant electrode pole and a second pair of horizontally orientated, spaced-apart, receiving electrodes mounted on said second electrode pole and electrically connected to said receiving circuit, said electrode poles being substantially perpendicular to one another.

5. In an underwater communication system of the type including a low frequency transmitter having associated therewith at least one transmitting electrode in conductive relationship with the water to establish an alternating electric field in the water, a receiver comprising:
   a submersible receiver housing;
   a pair of horizontally oriented electrode poles extending in angular relationship from the side of the housing;
   a pair of receiving electrodes supported on each of the electrode poles and spaced apart along the axis of each pole; and
   a receiving circuit associated with the housing and electrically connected to each pair of electrodes for producing an output signal in response to an alternating electric field gradient between at least one pair of electrodes.

6. The system according to claim 5 wherein said electrode poles are neutrally buoyant and of a telescoping structure to permit collapsing of the electrode poles when not in use.

7. The system according to claim 5 further comprising a housing for said receiver and wherein said electrode poles are resiliently secured to said housing to normally maintain said horizontal and perpendicular orientations when free in the water.

8. A receiver according to claim 5, wherein:
   the electrode poles are generally orthoganal to each other.

9. A receiver in accordance with claim 5, further comprising:
   means for mounting the electrode poles to the housing to be resiliently movable relative to the housing in at least one direction.

10. An underwater communication system comprising: transmitting means including a pair of spaced-apart transmitting electrodes in conductive relationship with the water excited by a low frequency transmitter to establish a low frequency alternating electric field in the water;
   a pair of receiving electrodes adapted for immersion in the water and operative to produce an electrical signal when the receivers intercept the alternating electric field generated by the transmitting means; and
   a receiver including frequency selective means responsive to the electrical signal from the receiving electrodes to produce an electrical signal only upon interception by the receiving electrodes of alternating electric field of predetermined frequency, an integrating circuit responsive to the electrical signal from the frequency selective means for producing an intermediate electrical signal having an amplitude directly related to the duration of the signal from the frequency selective means; and amplitude selective means responsive to the intermediate signal for generating an output representing desired information whenever the intermediate signal exceeds a predetermined amplitude level.

11. A system according to claim 10 wherein said predetermined electrical signal is a continuous signal and wherein said amplitude responsive means includes a latch circuit requiring a predetermined period of time for operation, said latch circuit being driven toward an open condition when said predetermined electrical signal is present at said receiver and being driven toward a quiescent closed condition in the absence of said predetermined electrical signal.

12. A system according to claim 10, wherein said alternating electric field is amplitude modulated and said receiver responds to amplitude modulated signals.

13. A system according to claim 10 wherein said transmitting means is effective to frequency modulate said alternating electric field and said receiver is responsive to deviations in the frequency of said alternating electric field from the predetermined frequency.

14. A system according to claim 10 wherein said transmitting means pulse modulates the alternating field and said receiver is responsive to pulse modulation of said field at the receiving electrodes.

15. An underwater communications system comprising:
a pair of spaced-apart transmitting electrodes in conductive relationship with the water and responsive to a predetermined electrical signal;
a low frequency transmitter connected to said transmitting electrodes to establish in the water an alternating electric field in accordance with said electrical signal;
an acoustic transmitting transducer responsive to the electrical signal to produce an acoustic signal in accordance therewith;
a pair of spaced-apart receiving electrodes in conductive relationship with the water and adapted to be disposed within said alternating electric field to receive said predetermined electrical signal;
an acoustic receiving transducer; and
a receiver tuned to the frequency of said predetermined electrical signal and coupled to said receiving electrodes and said acoustic transducer for developing an output signal representing the predetermined electrical signal and being operative to reject unwanted signals.

16. A system according to claim 15 further comprising output circuit means coupled to said receiver and operative to produce an output signal only when the proper acoustic and electrical signals are received simultaneously.

17. A system according to claim 15 further comprising output circuit means coupled to said receiver and operative to produce an output signal when either a proper acoustic signal or a proper electrical signal is received by one of said receivers.

18. An underwater communication system, comprising:
electric field generating means for establishing an electrical field in the water representing an electrical signal to be transmitted;
acoustic transmitting means for propagating an acoustic wave pattern through the water simultaneously with the existence of the electric field; and
underwater receiver means jointly responsive to the acoustic wave pattern and the electric field for generating a desired output signal.

19. A system according to claim 18, wherein the underwater receiver means comprises:
receiving electrode means responsive to the electrical field for recovering the electrical signal therefrom;
acoustic transducer means for converting the acoustic wave pattern into a second electrical signal; and
means jointly responsive to the first and second electrical signals for producing the output signal.

20. A system as set forth in claim 18 wherein: the acoustic wave pattern is representative of the electric signal, thereby to establish simultaneously existing acoustic and electric fields having a common characteristic.

21. In an underwater communications system, a receiver comprising:
a housing adapted for immersion in the water and carrying a mechanism capable of actuation:
receiving electrode means carried by the housing and responsive to the electric field in the water in the vicinity thereof to produce an electric signal; and
motor means having a rotatable member responsive to the electrical signal and operatively connected to the mechanism for actuating the mechanism upon a predetermined amount of rotation of the member.

22. A system as defined in claim 21, further comprising:
a motor control circuit intermediate the receiving electrode means and the motor means and operative to actuate the motor for rotation of the rotatable member from a reference position in one direction in the presence of said electrical signal, and to actuate the motor for rotation of the member in the opposite direction toward the reference position in the absence of said electrical signal.

23. A system in accordance with claim 21, further comprising:
automatic activation means carried by the housing for generating an electrical signal for actuating the motor means upon the elapse of a predetermined amount of time substantially greater than the amount of time required for rotation of the rotatable member between a reference position and a position actuating the mechanism.

* * * * *